US011632823B1

(12) United States Patent
Nematbakhsh et al.

(10) Patent No.: US 11,632,823 B1
(45) Date of Patent: Apr. 18, 2023

(54) ESTIMATING SENSOR TIMESTAMPS BY OVERSAMPLING

(71) Applicant: Waymo LLC, Mountain View, CA (US)

(72) Inventors: Shawn Nematbakhsh, Palo Alto, CA (US); Alec Berg, San Mateo, CA (US); Craig Robinson, San Francisco, CA (US); Alexander Zbrozek, Los Altos Hills, CA (US)

(73) Assignee: Waymo LLC, Mountain View, CA (US)

( * ) Notice: Subject to any disclaimer, the term of this patent is extended or adjusted under 35 U.S.C. 154(b) by 232 days.

(21) Appl. No.: 17/210,284

(22) Filed: Mar. 23, 2021

(51) Int. Cl.
H04W 84/18 (2009.01)
H04W 4/48 (2018.01)
H04L 12/40 (2006.01)
H04W 8/06 (2009.01)

(52) U.S. Cl.
CPC ............ H04W 84/18 (2013.01); H04L 12/40 (2013.01); H04W 4/48 (2018.02); H04W 8/06 (2013.01); H04L 2012/40273 (2013.01)

(58) Field of Classification Search
CPC ......... H04W 84/18; H04W 4/48; H04W 8/06; H04L 12/40; H04L 2012/40273
See application file for complete search history.

(56) References Cited

U.S. PATENT DOCUMENTS

| 7,937,232 B1 | 5/2011 | Chow et al. |
| 9,214,952 B2 | 12/2015 | Claus et al. |
| 9,383,234 B2 | 7/2016 | Lammel et al. |

(Continued)

FOREIGN PATENT DOCUMENTS

| EP | 2884351 A1 | 6/2015 |
| JP | 6483474 B2 | 3/2019 |

(Continued)

OTHER PUBLICATIONS

Ferrari, et al., "Timestamp Validation Strategy for Wireless Sensor Networks Based on IEEE 802.15.4 CSS," IEEE Transactions on Instrumentation and Measurement, 2014, vol. 63, Issue 11, pp. 2512-2521.

(Continued)

Primary Examiner — Jae Y Lee
(74) Attorney, Agent, or Firm — McDonnell Boehnen Hulbert & Berghoff LLP

(57) ABSTRACT

Systems and methods for estimating sensor timestamps by oversampling are provided. One example method involves observing, at a sampling frequency, sensor data from a register of a sensor. The sensor updates the register with sensor data at as sensor update frequency. The sampling frequency is different from the sensor update frequency. The method also involves generating, based on the sensor update frequency and the sampling frequency, an observed sequence representing the sensor data. The observed sequence indicates whether the register is observed to be updated or not updated. The method also involves estimating, from the observed sequence, the sensor update frequency and a sensor update phase. The method also involves determining, based on the sensor update frequency as estimated and the sensor update phase as estimated, a timestamp corresponding to an update of the register.

20 Claims, 12 Drawing Sheets

(56) References Cited

U.S. PATENT DOCUMENTS

| | | |
|---|---|---|
| 9,664,539 B2 | 5/2017 | Grant et al. |
| 9,977,839 B2 | 5/2018 | Czompo |
| 10,139,253 B2 | 11/2018 | LeGrand |
| 10,175,716 B2 | 1/2019 | Elias |
| 10,452,666 B2 | 10/2019 | Ishii et al. |
| 10,551,211 B2 | 2/2020 | Hsu |
| 10,601,571 B2 | 3/2020 | Haubelt et al. |
| 10,809,760 B1 | 10/2020 | Zhang et al. |
| 2011/0158331 A1 | 6/2011 | Kavaler et al. |
| 2015/0127284 A1 | 5/2015 | Seshan et al. |
| 2015/0185054 A1 | 7/2015 | Hesch et al. |
| 2017/0041688 A1* | 2/2017 | Pitigoi-Aron ............ G06F 1/08 |
| 2017/0153121 A1* | 6/2017 | Hsu ...................... G01C 22/006 |
| 2017/0242442 A1* | 8/2017 | Minster .................... G06T 7/38 |
| 2018/0091290 A1 | 3/2018 | Li |
| 2018/0232947 A1* | 8/2018 | Nehmadi ................ G01S 7/295 |
| 2018/0348810 A1 | 12/2018 | Giesselmann |
| 2018/0375743 A1 | 12/2018 | Lee et al. |
| 2020/0191609 A1 | 6/2020 | Schmidt et al. |
| 2020/0236517 A1 | 7/2020 | Matsunaga et al. |
| 2020/0272924 A1 | 8/2020 | Bianchi et al. |
| 2022/0268913 A1* | 8/2022 | Nordmeyer ........... F16F 9/0472 |

FOREIGN PATENT DOCUMENTS

| | | |
|---|---|---|
| WO | WO2014120178 A1 | 8/2014 |
| WO | WO2020/014813 A1 | 1/2020 |
| WO | WO2020/030214 A1 | 2/2020 |

OTHER PUBLICATIONS

Bu, et al., "Simultaneous spatiotemporal bias and state estimation for asynchronous multi-sensor system," The Journal of Engineering, 2019, vol. 2019, Issue 19.

* cited by examiner

600

| N | Sensor Frequency (< 2 KHz) | Sensor Frequency (> 2 KHz) |
|---|---|---|
| 11 | 1.909 | 2.091 |
| 10 | 1.9 | 2.1 |
| 9 | 1.889 | 2.111 |
| 8 | 1.875 | 2.125 |
| 7 | 1.857 | 2.143 |
| 6 | 1.833 | 2.167 |

Figure 6

ESTIMATING SENSOR TIMESTAMPS BY OVERSAMPLING

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors.

SUMMARY

In a first example, a system is provided. The system includes a sensor including a register. The sensor updates the register with sensor data at a sensor update frequency. The system further includes control circuitry configured to perform operations. The operations comprise observing, at a sampling frequency, sensor data front the register, where the sampling frequency is different from the sensor update frequency. The operations also comprise generating, based on the sensor update frequency and the sampling frequency, an observed sequence representing the sensor data, where the observed sequence indicates whether the register is observed to be updated or not updated. The operations also comprise estimating, from the observed sequence, the sensor update frequency and a sensor update phase. The operations also comprise determining, based on the sensor update frequency as estimated and the sensor update phase as estimated, a timestamp corresponding to an update of the register.

In a second example, a vehicle is provided that includes a sensor including a register, where the sensor updates the register with sensor data at a sensor update frequency, one or more processors, and data storage. The data storage stores instructions that, when executed by the one or more processors, cause the vehicle to perform operations. The operations comprise observing, at a sampling frequency, sensor data from the register, where the sampling frequency is different from the sensor update frequency. The operations also comprise generating, based on the sensor update frequency and the sampling frequency, an observed sequence representing the sensor data, where the observed sequence indicates whether the register is observed to be updated or not updated. The operations also comprise estimating, from the observed sequence, the sensor update frequency and a sensor update phase. The operations also comprise determining, based on the sensor update frequency as estimated and the sensor update phase as estimated, a timestamp corresponding to an update of the register.

In a third example, a method is provided that involves observing, at a sampling frequency, sensor data from a register of a sensor. The sensor updates the register with sensor data at a sensor update frequency. The sampling frequency is different from the sensor update frequency. The method also involves generating, based on the sensor update frequency and the sampling frequency, an observed sequence representing the sensor data. The observed sequence indicates whether the register is observed to be updated or not updated. The method also involves estimating, from the observed sequence, the sensor update frequency and a sensor update phase. The method also involves determining, based on the sensor update frequency as estimated and the sensor update phase as estimated, a timestamp corresponding to an update of the register. These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 illustrates a table with example sensor update frequencies, according to example embodiments.

DETAILED DESCRIPTION

Figure 1:
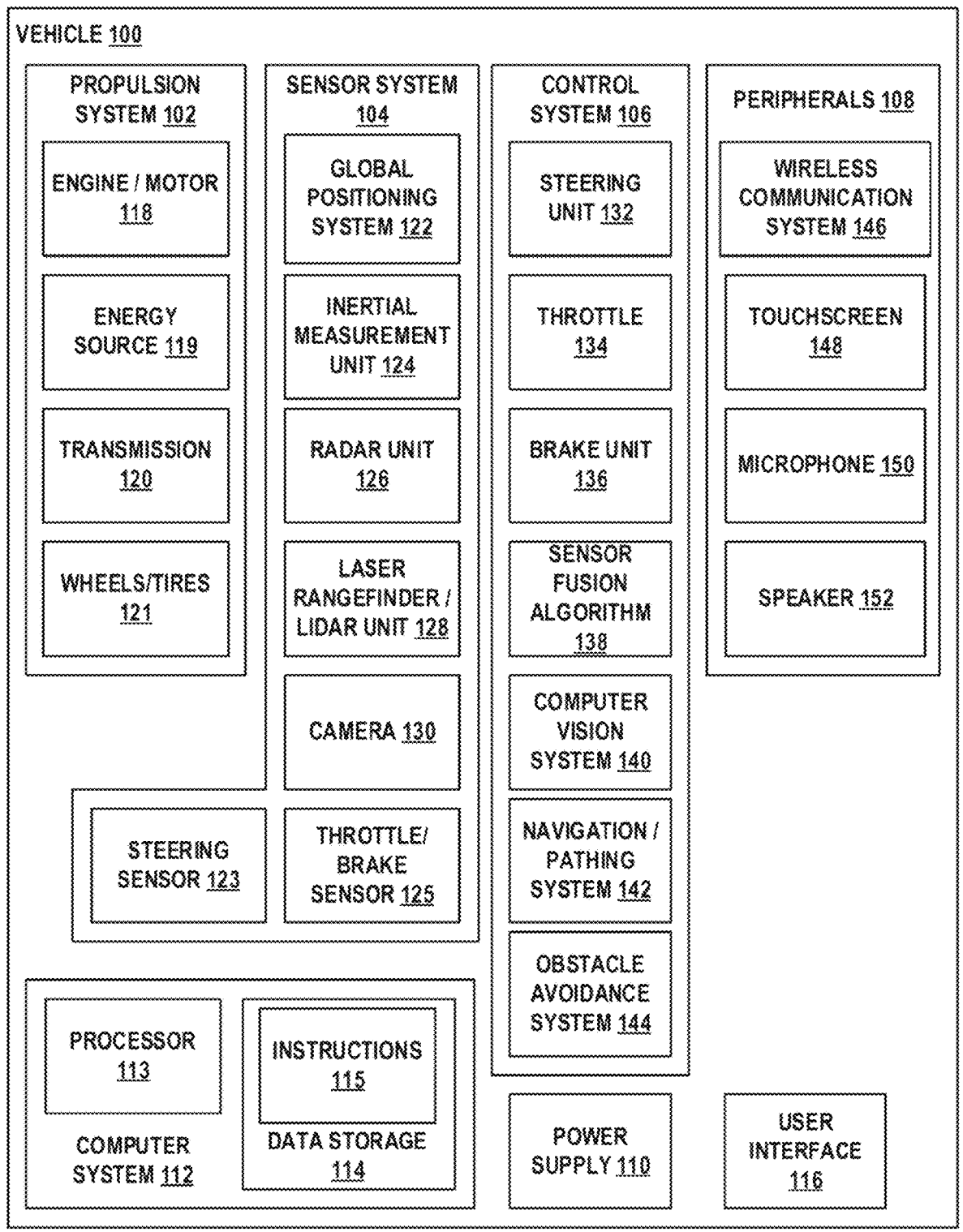
FIG. 1 illustrates a block diagram of a vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A vehicle may include a variety of sensors mounted at different locations on and/or inside the vehicle. Each sensor may provide an output that varies depending on an internal timing mechanism of the sensor. For example, a sensor (e.g., an accelerometer) can have an internal register that has a resister update period. In some instances, an accelerometer can have an internal register update period within a range of 10% of 500 microseconds ($\mu s$). Generally, a microcontroller unit (MCU) may observe the register updates, but does not have access to actual timestamp data of the sensor. Thus, although the MCU is able to read and observe changes to the sensor register, it is unable to determine when those updates are made by the sensor. Accordingly, example timestamp estimating processes are provided herein to enable the MCU to identify times at which a sensor updates register values utilizing its own internal sensor clock, to which the MCU does not have access.

Some examples herein may also involve estimating a sensor update frequency and a sensor update phase. Although a sensor can be configured to operate at a nominal frequency, it may, in practice, operate at a frequency slightly below or slightly above the nominal frequency. Accordingly, some examples herein identify patterns in sensor data that indicate whether the sensor is operating at a rate less than, or greater than, the nominal frequency. Further examples illustrate how the sensor update frequency may be estimated. Other advantages and examples are possible as well.

II. Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth.

IMU 124 may have a configuration that uses one or more accelerometers and/or gyroscopes and may sense position and orientation changes of vehicle 100 based on inertial acceleration. For example. IMU 124 may detect a pitch, roll, and/or yaw of the vehicle 100 while vehicle 100 is stationary or in motion. In some embodiments, IMU 124 may include a register that records data from IMU 124 (e.g., an accelerometer), such as the position and orientation changes of vehicle 100 based on inertial acceleration. In some embodiments, IMU 124 may be equipped with an internal clock, and the register may be updated at a sensor update frequency. In some embodiments, the sensor update frequency may be at 2 kiloHertz (2 kHz). One or more accelerometers may sense changes in vehicular acceleration, and record each change in a register. Such recording may occur at the sensor update frequency that is controlled by the accelerometer's internal clock. The register may make sensor data available to control system 106 and/or computer system 112. Sensor data may then be processed, for example, by utilizing a sensor fusion algorithm 138.

In some embodiments, IMU 124 may be sensitive to environmental conditions such as temperature, altitude, barometric pressure, and so forth.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering, wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., butterfly valve or carburetor.) Additionally, throttle/brake sensor 125 may measure a pressure of one or more brake pads on a rotor vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control systems 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100.

Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within as given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIG-BEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Also, for example, computer system 112 may utilize input from sensor system 104 in order to estimate a sensor update frequency of a sensor (e.g., one or more accelerometers in IMU 124) in sensor system 104, estimate a sensor update phase for the sensor, determine a timestamp based on the sensor update frequency as estimated and the sensor update phase as estimated, and associate a timestamp corresponding to an update of a register in the sensor. For example, computer system 112 may make a determination about various objects based on a timestamp associated with a change in acceleration in conjunction with timing data obtained from the lasers or other optical sensors configured to sense objects in a field of view of the vehicle.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
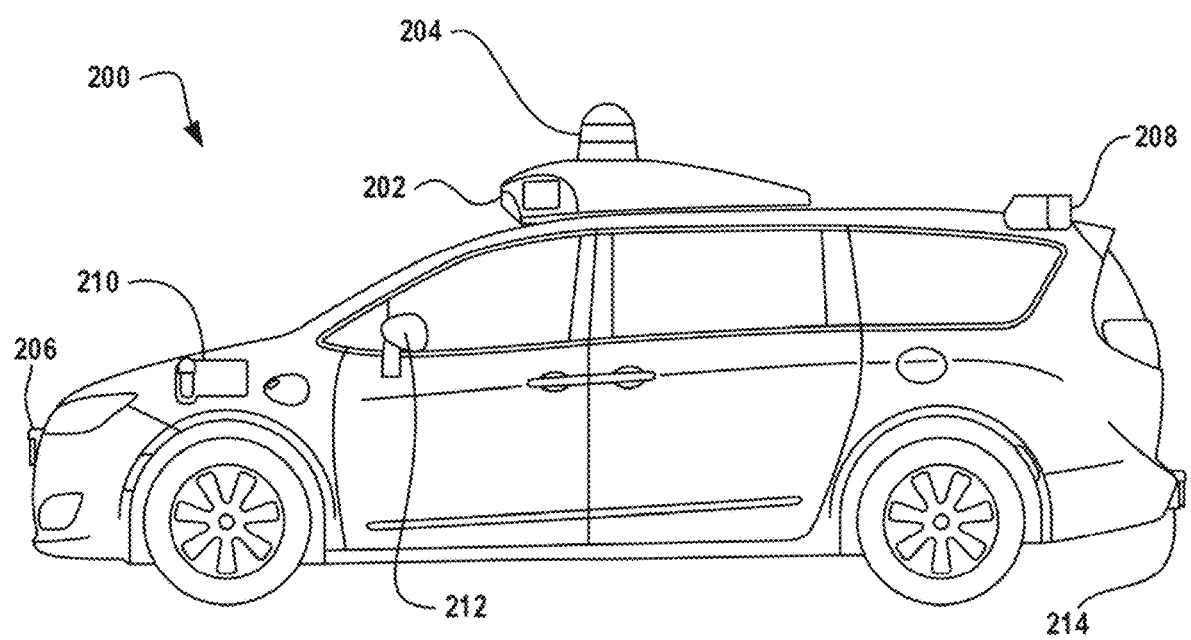
FIG. 2 illustrates a physical configuration of a vehicle, in accordance with example embodiments.

FIG. 2 shows an example vehicle 200 that can include some or all of the functions described in connection with vehicle 100 in reference to FIG. 1. Although vehicle 200 is illustrated in FIG. 2 as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a radar unit 208, a LIDAR/radar unit 210, and two additional locations 212, 214 at which an accelerometer, a gyroscope, a radar unit, LIDAR unit, laser rangefinder unit, and/or other type of sensor or sensor(s) could be located on the vehicle 200. The LIDAR/radar unit 210 can take the form of a LIDAR unit, a radar unit, or both.

Furthermore, the example vehicle 200 can include any of the components described in connection with vehicle 100 of FIG. 1. The radar unit 208, and/or the LIDAR units 204, 206 can actively scan the surrounding environment for the presence of potential obstacles and can be similar to the radar 126 and/or laser rangefinder/LIDAR 128 in the vehicle 100. As another example, an accelerometer at location 212 can be similar to the accelerometer included in IMU 124 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport system.

The vehicle 200 can include a camera, possibly at a location inside sensor unit 202. The camera can he a photosensitive instrument, such as a still camera, a video camera, etc., that is configured to capture a plurality of images of the environment of the vehicle 200. To this end, the camera can he configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
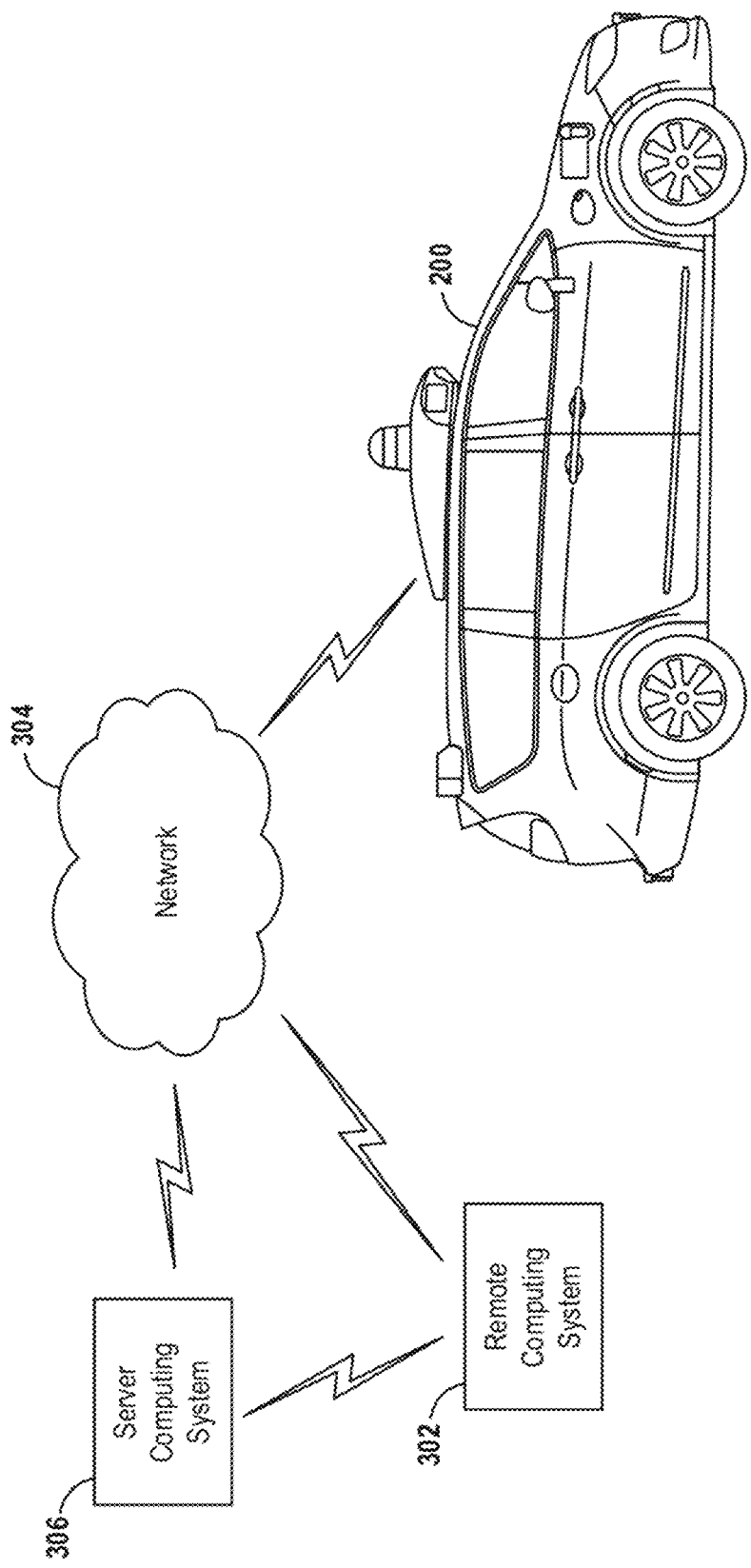
FIG. 3 is a conceptual illustration of wireless communication between various computing systems and a vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. In some examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. In one example, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In yet another example, remote computing system 302 may be a computing device with a touchscreen operable by the passenger of vehicle 200.

In some embodiments, cone or more operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, serer computing system 306, or a computing system local to vehicle 200) may operate to use an accelerometer to determine changes in acceleration of an autonomous vehicle. In general, at least one computing system will be able to analyze sensor data from the accelerometer, determine a timestamp associated with the sensor data, and possibly control the autonomous vehicle.

In some embodiments, to facilitate autonomous operation, a vehicle (e.g., vehicle 200) may receive sensor data representing changes in vehicular acceleration in a variety of ways. An accelerometer on the vehicle may provide the sensor data representing changes in acceleration (e.g., updates made to a register of the accelerometer), and the accelerometer may communicate sensor data to a processor in the vehicle.

III. Example Sensor Update Frequency Estimating Operations

A sensor (e.g., an accelerometer) can have an internal register that holds sensor data that is updated at a register update period. For example, an accelerometer can have an internal register update period within a range of 10% of 500 microseconds (µs). Generally, a microcontroller unit (MCU) may observe the register updates, but does not have access to actual timestamp data of the sensor. In some instances, a timestamp may be obtained from a serial peripheral interface (SPI) that communicates data between the sensor and the MCU. However, this timestamp is not accurate, and its inaccuracy may have impactful negative effects. For example, a simulated one meter per square second (m/s$^2$) magnitude acceleration profile sampled at 50 Hertz (Hz) can cause an integration error of approximately two (2) centimeters per second (cm/s) over one second. Precise values for the error may depend on factors, such as, for example, the sampling frequency.

A MCU is generally configured to sample each sensor register at a rate of 3 kiloHertz (kHz). The MCU can observe when a register is updated, and a timestamp for the most recent register update can be estimated by estimating a period of the sensor's internal update, as described herein.

a. Identifying Periods with Skipped or Extra Sensor Updates

Figure 4:
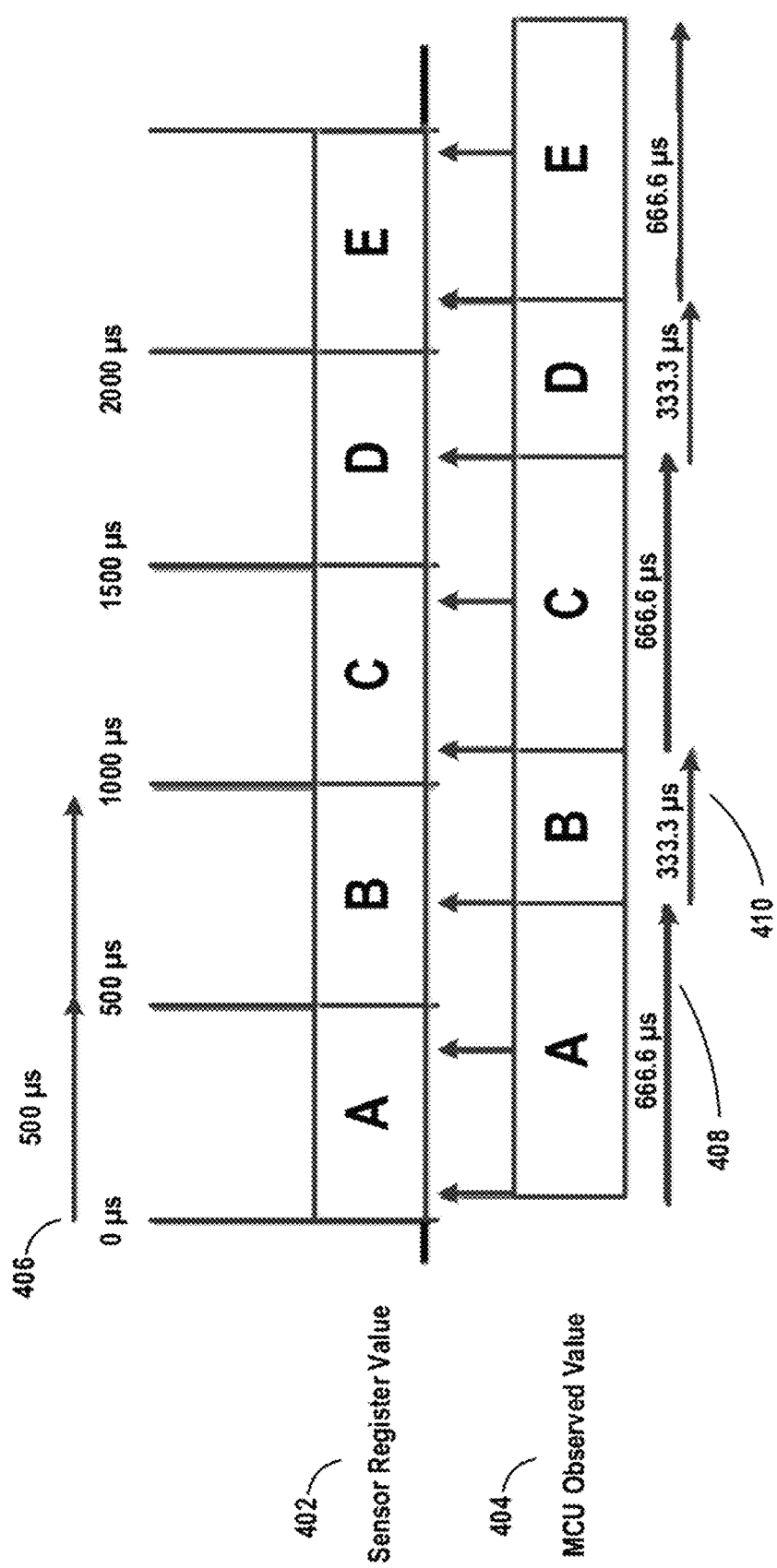
FIG. 4 illustrates an example timing diagram for a register update, according to example embodiments.

FIG. 4 illustrates an example timing diagram for a register update, according to example embodiments. Some operations may involve observing, at a sampling frequency, sensor data from a sensor register, where the sampling frequency is different from the sensor update frequency. For example, the MCU can observe, at a sampling frequency, sensor data from the register of a sensor (e.g., an accelerometer mounted on vehicle 100 or vehicle 200). The sampling frequency may be greater than the sensor update frequency. For example, the MCU may be sampling a certain register at a regular rate of 3 kHz, or with a sampling period of 333.3 µs. The sensor may be updating the register at a nominal rate of 2 kHz, or with a nominal period of 500 µs. The sensor may update a register and record sensor register values 402. The MCU may observe the sensor register values 402 and record them as MCU observed values 404. As indicated, the sensor may be configured to update the sensor register at a nominal frequency of 2 kHz, which corresponds to a nominal period 406 of 500 µs. The MCU may be configured to observe (or sample) the sensor register values 402 at a sampling frequency of 3 kHz. Accordingly, the MCU oversamples the sensor register values 402 by obtaining three readings for every two register updates.

During a time interval 0 µs to 500 µs, the sensor register value 402 is "A," and at time 500 µs, the sensor register value 402 is updated to "B." This generates the first two terms of the baseline sequence "A, B." During the same time interval from 0 µs to 500 µs, corresponding to a nominal period, the MCU makes two observations, at 0 µs and at 33 µs. At both observation times (corresponding to a sampling period of 333.3 µs), the MCU observes sensor register value 402 as "A", thereby generating the first two terms of an observed sequence "A, A." After passage of another 333.3 µs, the MCU observes that the sensor register value 402 has been updated to "B", and so at the third sampling, the MCU adds a third term to the observed sequence, which becomes, "A, A, B."

Therefore, when a register is updated at a nominal frequency (which corresponds to a nominal period), and the MCU oversamples the register by sampling at a sampling frequency which is greater than the nominal frequency, a pattern of "A A,B" or "Update, no Update, Update" may be observed. This may be represented as a binary string. For example, the MCU samples the input and records '1' if the input has changed since the previous sample, or '0' if the input has not changed since the previous sample, a baseline sequence will be recorded. Accordingly, for "Update, no Update, Update," the binary string can be determined as "1, 0, 1," and a baseline sequence can be generated as the MCU continues to sample the sensor register values 402.

In practice, the sensor may not update the register values at a nominal frequency. Instead, the sensor update frequency may be greater than or less than the nominal frequency. If the sensor update frequency is greater than the nominal frequency, then the sensor is updating the register at a faster rate, and so register updates are being made over shorter time intervals. Accordingly, the sensor update period will be smaller than the nominal period. Likewise, if the sensor update frequency is less than the nominal frequency, then the sensor is updating the register at a slower rate, and so register updates are being made over longer time intervals. Accordingly, the sensor update period will be greater than the nominal period. Accordingly, in some embodiments, an observed sequence representing the sensor data can be generated, where the observed sequence indicates whether the register is observed to be updated or not updated. Generally, as described herein, the generating can be based on the sensor update frequency and the sampling frequency.

Figure 5:
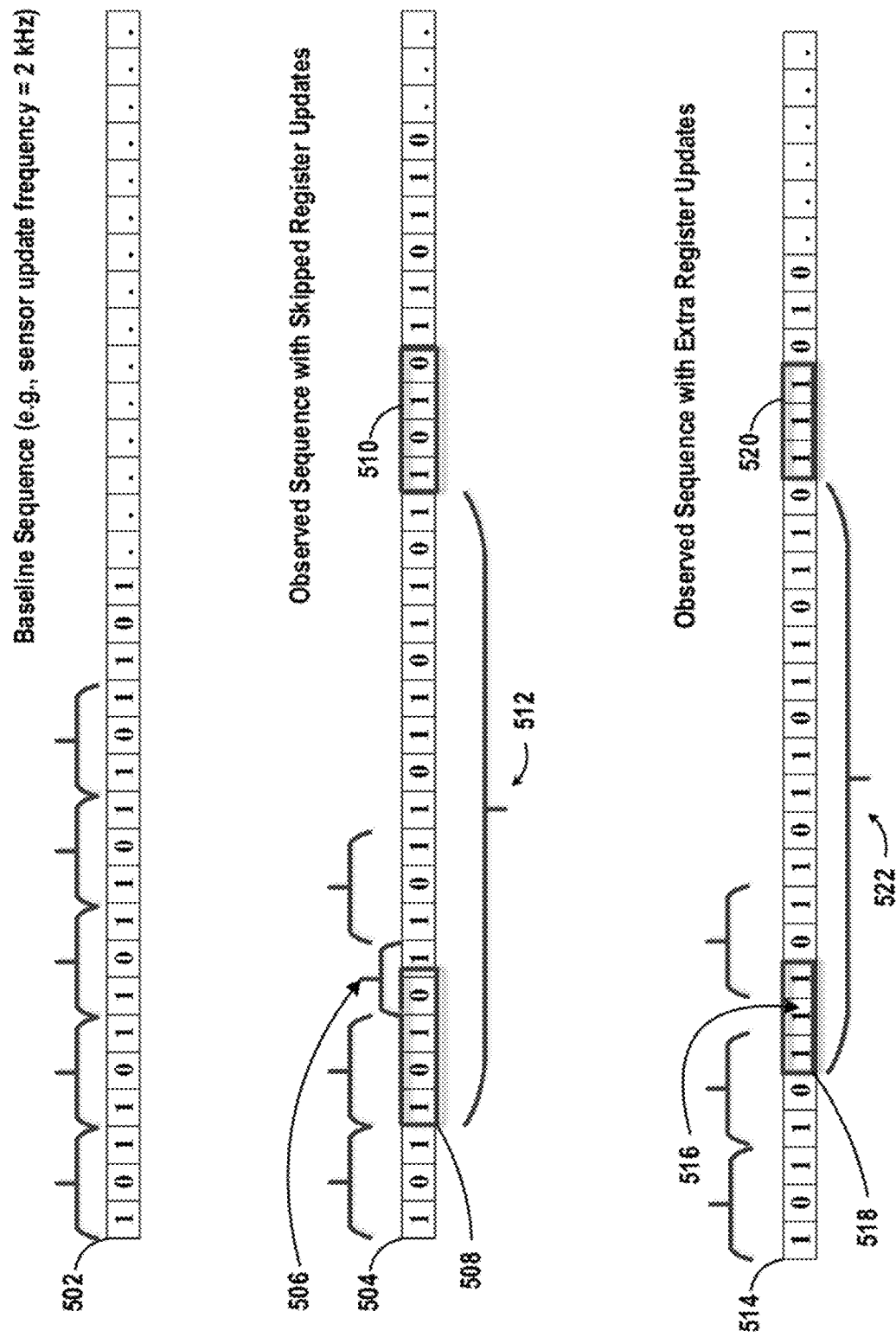
FIG. 5 illustrates an example baseline sequence and example observed sequences, according to example embodiments.

FIG. 5 illustrates an example baseline sequence 502, and example observed sequences 504 and 512, according to example embodiments. As indicated, baseline sequence 502 corresponds to a sequence of concatenated strings "1, 0, 1" corresponding to "Update, No Update, Update," as described with reference to FIG. 1. The baseline sequence represents observed values when the register is updated at a nominal frequency (e.g., 2 kHz) and the MCU is oversampling at sampling frequency (e.g., 3 kHz) greater than the nominal frequency. Although values of 2 kHz for nominal frequency and 3 kHz for sampling frequency are used throughout this description, these values are for illustrative purposes only.

In some embodiments, the sensor is configured to update the register at a nominal frequency, and the sensor data captures every update of the register. In such instances, a baseline sequence and an observed sequence can be compared to identify a skipped register update or an extra register update. For example, when the sensor updates the register with sensor data at a frequency slightly less than a nominal frequency of 2 kHz (e.g., 1.95 kHz), an observed sequence 504 will be recorded. From observing the string 508, "1, 0, 1, 0" (666 µs period for two consecutive register changes), it may be inferred that a register update has been skipped, and that the sensor is updating the register at a rate slower than 2 kHz (relative to a timing mechanism in the MCU). The observed sequence "1, 0, 1, 0" indicates a skipped register update when compared to the baseline sequence 502. For example, baseline sequence 502 indicates a repetitive pattern of digits "1, 0, 1" corresponding to "update, no update, update," as highlighted with successive square brackets. However, in observed sequence 504, after two initial patterns of digits "1, 0, 1," and "1, 0, 1," (indicated with square brackets), a short pattern 506 comprising "0, 1" is observed. This indicates that a first register value of "1" has been skipped in the pattern "1, 0, 1", which indicates that a register update has been skipped. Accordingly, this results in strings 508 and 510, comprising "1, 0, 1, 0," and this pattern is indicative of a skipped register update.

Similarly, when the sensor updates the register with sensor data at a rate faster than 2 kHz, an observed sequence 514 will be recorded. From observing the string 518 comprising digits "1, 1, 1" (333 µs period for two consecutive register changes), it may be inferred that an extra register update has been observed, and that the sensor is updating the register at a rate slightly faster than 2 kHz (relative to the timing mechanism in the MCU). The observed sequence "1, 1, 1" indicates an extra register update when compared to the baseline sequence 502. For example, baseline sequence 502 indicates a repetitive pattern of digits "1, 0, 1" corresponding to "update, no update, update." However, in observed sequence 514, after two initial patterns of digits "1, 0, 1" and "1, 0, 1," an extra update 516 with a value "1" is observed, before the next occurrence of the pattern "1, 0, 1." This indicates that an extra register value of "1" has been observed, which indicates that a register update has been added. Accordingly, this results in a pattern 518 comprising "1, 1, 1" and this pattern is indicative of an extra register update.

In some embodiments, the sensor update frequency can be estimated by calculating an average time between skipped register updates or extra register updates. For example, in observed sequence 504, region 512 represents one period beginning with a skipped register update 508, ending just before the subsequent skipped register update 510. In this period, there are 11 register updates observed during 17 MCU samples, which yields a sensor update frequency of 11/(17*.3333)=1.9412 kHz.

As another example, in observed sequence 514, region 522 represents one period beginning with an extra register update 518, ending just before the subsequent extra register update 520. In this period, there are 11 register updates (ones) observed during 16 total MCU samples (ones and zeros), which yields a sensor update frequency of 11/(16*.333)=2.0625 kHz.

Generally, the period between consecutive extra register updates of length N(MCU Samples) will yield a sensor update frequency of $$2 + \frac{1}{N}.$$

Similarly, the period between consecutive skipped register updates of length N (MCU samples) will yield a sensor update frequency of $$2 - \frac{1}{N}.$$

FIG. 6 illustrates a table 600 with example sensor update frequencies, according to example embodiments. First column 602 of table 600 lists a value for length N, second column 604 of table 600 lists an estimated sensor update frequency when skipped register updates are observed, and third column 606 of table 600 lists an estimated sensor update frequency when extra register updates are observed.

For example, first row 608 of table 600 illustrates an example, where N=11, Accordingly, 1/N=0.091, and so the period between consecutive skipped register updates of length 11 will yield a sensor update frequency of $$2 - \frac{1}{N} = 2 - 0.091 = 1.909.$$

Similarly, the period between consecutive extra register updates of length 11 will yield a sensor update frequency of $$2 + \frac{1}{N} = 2 + 0.91 = 2.091.$$

As another example, third row 610 of table 600 illustrates an example, where N=9. Accordingly, 1/N=0.111, and so the period between consecutive skipped register updates of length 9 will yield a sensor update frequency of $$2 - \frac{1}{N} = 2 - 0.111 = 1.889.$$

Similarly, the period between consecutive extra register updates of length 9 will yield a sensor update frequency of $$2 + \frac{1}{N} = 2 + 0.111 = 2.111.$$

For sensor update frequencies close to a nominal frequency (e.g., 2 kHz), a large number of samples must be observed to get an estimate of sensor update frequency since the period between consecutive skipped register updates or extra register updates is much longer. For example, if a sensor update frequency is 1.999 kHz, this would mean that for N=1000, 1.999=1999/1000=2-1/1000. Accordingly, a period between skipped register updates will be one second.

b. Identifying Constant Value Register Updates

The above described techniques are based on an assumption that the register being observed (to estimate the sensor update frequency) always changes at the sensor update period. In some example implementations, the register may not update at every sensor update period, because the sensor may be observed no change in a measured attribute during a time period. For example, it can be experimentally demonstrated that for a certain stationary accelerometer, about 40% of sensor updates may be observed to produce a change in the accelerometer's register. When the accelerometer is manually wobbled, about 67% of sensor updates may be observed to produce a change in the accelerometer's register.

A constant value register update (sometimes referred to herein as a phantom update) generally means that the sensor has updated the register, but the MCU cannot determine that an update occurred since the register contents have not changed. This means that one or more updates made by the sensor may not be observed by the MCU, hence the term, phantom. Generally, in terms of the binary sequences (e.g., observed sequence), this means that the baseline sequence may include a "1", however the observed sequence may not observe the value "1" and may instead record the register value as "0".

Figure 7:
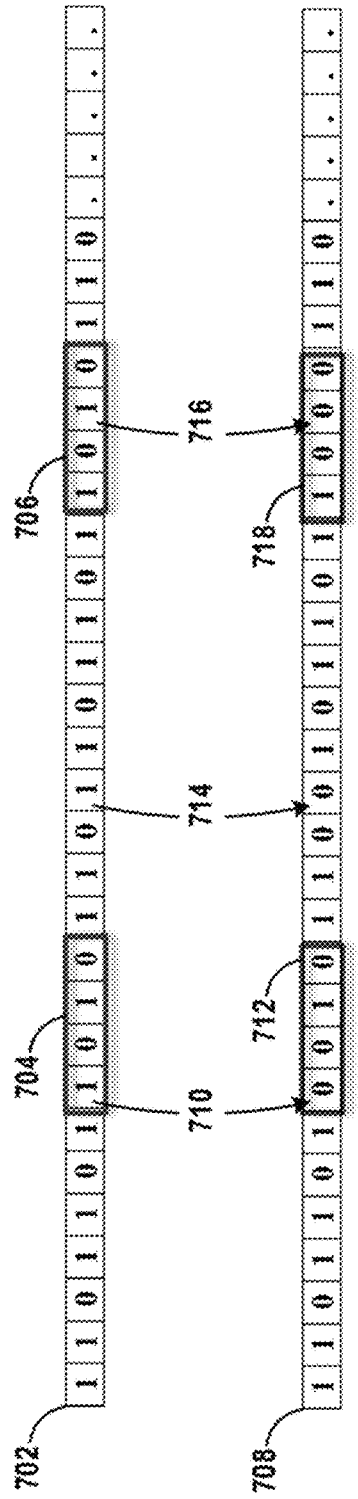
FIG. 7 illustrates an example phantom register update, according to example embodiments.

FIG. 7 illustrates an example phantom register update, according to example embodiments. Sequence 702 illustrates an example sequence of actual register updates. However, observed sequence 708 may be different from sequence 702. For example, as indicated by arrow 710, string 704 comprising digits "1, 0, 1, 0" indicating a skipped register update is observed as string 712 comprising digits "0, 0, 1, 0," which is not indicative of a skipped register update. Also, for example, as indicated by arrow 716, string 706 comprising digits "1, 0, 1, 0" indicating a skipped register update is observed as string 718 comprising digits "1, 0, 0, 0," which is not indicative of a skipped register update. Likewise, as indicated by arrow 714, a digit "1" in sequence 702 indicating that the register was updated, may be observed as a digit "0" in observed sequence 708, indicating that the register was not updated.

Due to an occurrence of phantom register updates, it may be difficult to correctly identify skipped register updates or extra register updates. Accordingly, a solution based on determining a period between consecutive skipped register updates or consecutive extra register updates may not be reliable. In such instances, statistical techniques can be applied to estimate the sensor update frequency.

In some embodiments, the observed sequence can be transformed to a hold sequence. Generally, a hold sequence comprises hold values, where a hold value represents a number of times the register is observed to indicate that a sensor value remains unchanged during consecutive sampling periods.

Figure 8:
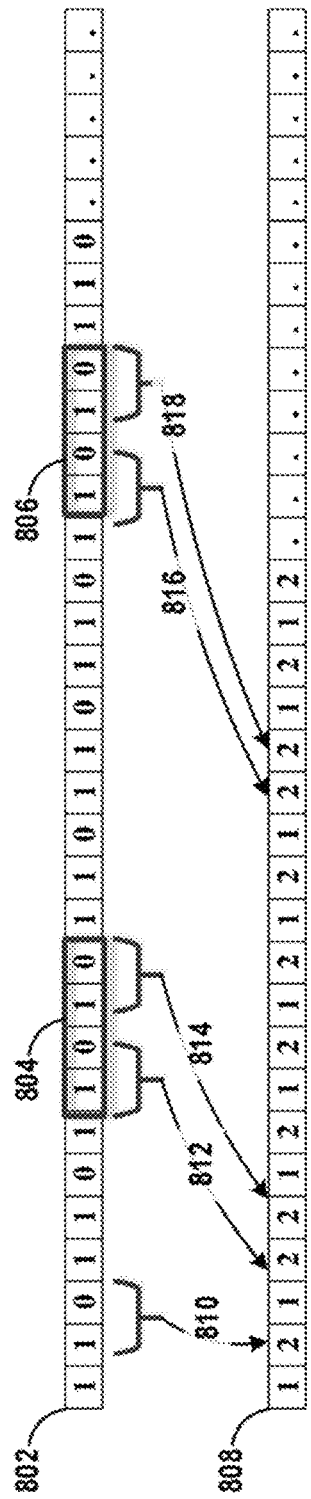
FIG. 8 illustrates an example hold sequence, according to example embodiments.

FIG. 8 illustrates an example hold sequence, according to example embodiments. As described herein, in an absence of phantom register updates, observed sequence 802 comprises skipped register updates 804 and 806, and it can be inferred that the sensor update frequency is smaller than 2 kHz.

As indicated by arrow 810, a sequence of digits "1, 0" in observed sequence 802 corresponds to a digit "2" in hold sequence 808. For example, digits "1, 1, 0, 1" in observed sequence 802 indicate that the register value was updated, followed by another update, then remained unchanged, and was followed by another update. Accordingly, the digits "1, 0" when preceded and succeeded by a "1" indicate a hold value of "2" in that the sensor value remained consecutively unchanged during two consecutive sampling periods. For example, this would mean that a value for the acceleration remained unchanged during two consecutive sampling periods.

As another example, although not shown in FIG. 8, a pattern in an observed sequence corresponding to "1, 0, 0, 0, 0, 0, 1" would indicate that the sensor value remained consecutively unchanged during six consecutive sampling periods, and therefore a hold value would be 6. Applying this algorithm to observed sequence 802 of FIG. 8, a pattern 804 comprising digits "1, 0, 1, 0" corresponding to a skipped register update, is transformed to a pattern "2, 2" in hold sequence 808, as indicated by arrows 812 and 814 respectively. Likewise, a pattern 806 comprising digits "1, 0, 1, 0" corresponding to another skipped register update, is transformed to another pattern "2, 2" in hold sequence 808, as indicated by arrows 816 and 818 respectively. In an absence of phantom register updates, an observed sequence corresponding to skipped register updates transforms to a hold sequence comprising hold values 1, and 2. Likewise, in the absence of phantom register updates, an observed sequence corresponding to extra register updates transforms to a hold sequence comprising hold values 1, and 2 as well.

However, in the presence of phantom register updates, hold values longer than 1 or 2 are possible. A hold value of 1 or 2 may be observed when two consecutive register updates are not skipped. In such instances, a probability of observing a hold value of 1 or 2 indicates the sensor update frequency. Accordingly, the sensor update frequency can be estimated statistically by calculating a ratio of observed hold values of 1 and 2 over a long period of time.

In some instances, a histogram can be generated to visualize a long range pattern of hold values. For example, for an observed sequence "A, A, A, B, C, D, D, E, F, F, F, F, G" the hold values are "3, 1, 1, 2, 1, 4, 1," since the value "A" is observed three times, "B" and "C" are observed once each, "D" is observed twice, "E" is observed once, "F" is observed four times, and "G" is observed once. Accordingly, a number of occurrences for hold values 1, 2, 3, and 4 can be determined as 1 occurs four times, 2 occurs once, 3 occurs once and 4 occurs once. A histogram can be generated from such data.

Figure 9:
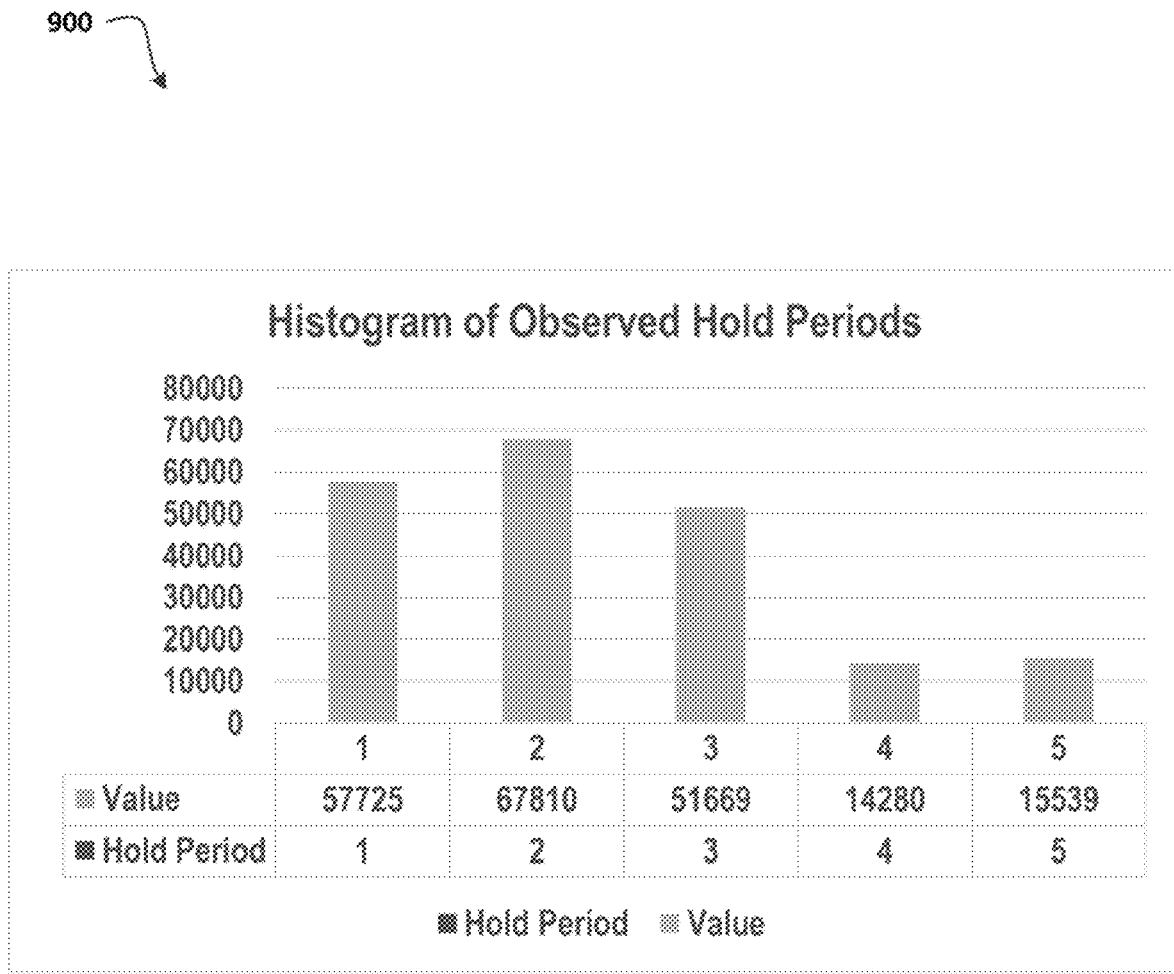
FIG. 9 illustrates a histogram of example hold values, according to example embodiments.

FIG. 9 illustrates a histogram 900 of example hold values, according to example embodiments. For example, a number of occurrences of hold values 1, 2, 3, 4, and 5 are tabulated, and histogram 900 displays the values. Hold value 1 is observed to occur 57725 times, and hold value 2 is observed to occur 67810 times. Accordingly, a ratio of an occurrence of hold value 2 to hold value 1 may be determined as 67810/57725 to obtain 1.175. Accordingly, for a given time interval, in an absence of phantom updates, an expected number of sensor updates that would be observed can be determined as (1.175+1) during every (2*1.175+1)/3 milliseconds (ms). Therefore, the sensor update frequency can be inferred to be 1.948 kHz.

In some instances, when a sensor update frequency is known to be less than 2 kHz, additional inferences can be made based on hold values 3 and 4 as well. For example, a hold value "1" followed by a hold value "4" in a hold sequence indicates that absent phantom updates, two consecutive hold values of "2" would be observed. Also, for example, a hold value of 3 indicates that absent phantom updates, a hold value of "2" followed by a hold value of "1" would be observed. Accordingly, a hold sequence corresponding to phantom updates, with hold values higher than 1 or 2 can be represented in terms of hold values 1 or 2, and transformed to a hold sequence that does not correspond to phantom updates, and statistical methods applicable in the absence of phantom updates may be applied to estimate the sensor update frequency.

In some instances, the sensor update frequency may be greater than 2 kHz. Accordingly, in an absence of phantom register updates, it would be likely that hold values "1" would exceed hold values "2." In some example implementations, when a pattern "1, 1, 1" corresponding to an extra register update occurs, a middle update in the pattern may be undetectable because of a phantom update. According, an observed sequence would include a pattern "1, 0, 1" instead of "1, 1, 1," and as previously described, a hold value of "2" would occur in a hold sequence. For example, assuming that the register is always updated, and due to phantom register updates, a pattern "1, 1, 1" is observed as "1, 1." Accordingly, an expected hold sequence would be as follows, where the digits in square brackets indicate a phantom register update:

$$1, 2, 1, 2, [1, 1,]2, 1, 2, [1, 2,]\ldots \qquad \text{(Eqn. 1)}$$

However, due to the presence of phantom updates, an observed hold sequence would be as follows, where "[1, 1]" is replaced with "2" and indicated in bold below, and "[2, 2]" is replaced with "3" and indicated in bold below:

$$1, 2, 1, 2, 2, 2, 1, 2, 3, \ldots \qquad \text{(Eqn. 2)}$$

In this instance, presence of phantom register updates causes a hold value of "2" to occur more than an expected number of times. Accordingly, in determining the sensor update frequency based on a ratio of a number of hold values "2" to a number of hold values "1", as was previously performed in the case where the sensor update frequency was smaller than 2 kHz, the estimated sensor update frequency would be slower than expected. Therefore, a technique is described herein that compensates for an over counting of hold values "2".

As previously described, in the absence of phantom register updates, hold values 1 or 2 would be observed. According, let n denote a fraction of observed hold values corresponding to "1" in a hold sequence. Therefore, 1-n would denote a fraction of observed hold values corresponding to "2" in the hold sequence. Next, assuming a presence of phantom register updates, there is a positive probability, p, that a register update results in an observable change in a register value. In such an instance, the sensor update frequency can be determined based on a normalized histogram comprising respective frequencies of the hold values. For example, a normalized histogram for hold values 1 and 2 may be determined as:

1:$n*p$

2:$(1-n)*p+X$ (Eqn. 3)

where X is a fraction of observations where consecutive hold values 1 are observed as hold values 2. Assuming that p is a memoryless property with independent probability, the probability of a register change not occurring during a register update, followed by a register change occurring during register update may be determined as $(1-p)*p$. Further, when an update period is faster than 500 μs (e.g., between 333.33 μs and 500 μs), it may be inferred that, a sensor value not changing during a register update, followed by a change in sensor value during a register update, results in two observed hold values: a hold value 2 (if the observation occurred during an extra register update), or a hold value 3 (actual hold values 2+1 or 1+2). Accordingly, a normalized histogram may be determined as follows:

1:$n*p$

2:$(1-n)*p+X$

3:$(1-p)*p-X$ (Eqn. 4)

Letting $S=P(1)+P(2)+P(i)$ where P(i) denotes a probability of hold value "i". Using Equation 4, and taking a sum of these probabilities, a value for p may be determined as follows:

$$S = n*p + (1-n)*p + X + (1-p)*p - X = \qquad \text{(Eqn. 5)}$$
$$np + p - np + X + p - p^2 - X = 2p - p^2 - p^2 + 2p - S = 0$$

This may be solved as a quadratic equation in variable p, and as p is a non-zero probability, it follows that 0≤p≤1, and that:

$$p = \frac{-2 + \sqrt{4-4S}}{-2} \qquad \text{(Eqn. 6)}$$

Accordingly, $p=1-\sqrt{1+S}$. A ratio of an excess of hold values "1" to hold values "2" can be determined as:

$$\frac{n*p - ((1-n)*p)}{n*p + (1-n)*p} = \frac{2*np - p}{p} = \frac{2*P(1)-p}{p} \qquad \text{(Eqn. 7)}$$

In some embodiments, an error in an estimation of the sensor update frequency can be determined. For example, if the sensor update frequency is generally constant, the error can be reduced over time as in more data is added to the histogram. A sensor is a mechanical device, and therefore environmental factors such as temperature, pressure, altitude, and so forth may impact the sensor update frequency over time. In some embodiments, such an adverse effect due to environmental factors may be offset by applying a higher weight to more recent sample data that is added to a histogram, compared to data that appeared some time ago. In some embodiments, such a relative weighting may be applied based on one or more time thresholds. For example, the last 100 entries (corresponding to recent updates) may he weighted at 0.8, and earlier entries (corresponding to older updates) may be weighted at 0.2. As another example, the last 1000 entries (corresponding to recent updates) may be weighted at 0.6, the 1000 entries previous to that may be weighted at 0.3, and the earlier entries may be weighted at 0.1.

IV. Example Sensor Update Phase Estimating Operations

A sensor timestamp can be determined based on a sensor update frequency and a sensor update phase. To determine the sensor update phase, a reference time may be determined when a sensor update is known to have occurred. In some embodiments, such a reference time may be determined based on anomalies in a hold sequence as an indicator of phase. For example, extra register updates and/or skipped register updates may be used as phase markers.

In some embodiments, the sensor update frequency as estimated may be less than a nominal frequency at which the sensor is configured to operate. For example, the sensor update frequency as estimated may be less than 2 kHz. Such an instance is indicative of update periods that are longer than 500 μs. As described previously, in such instances, skipped register updates are observed. For example, a pattern "0, 1, 0, 1" may be observed in an observed sequence, or a corresponding pattern of "2, 2" may be observed in a holding sequence corresponding to the observed sequence.

Figure 10:
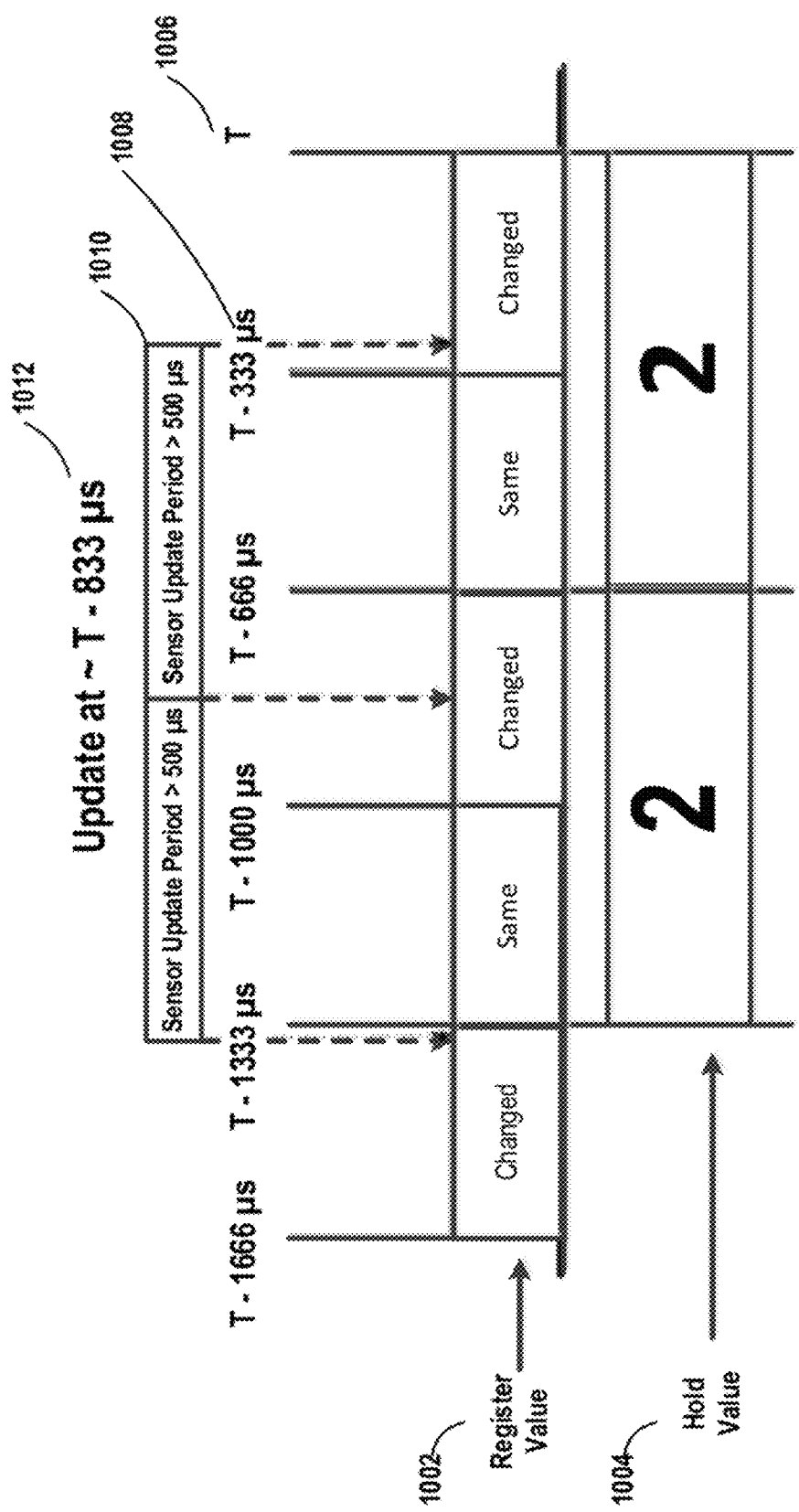
FIG. 10 illustrates an example estimation of a sensor update phase, according to example embodiments.

FIG. 10 illustrates an example estimation of a sensor update phase, according to example embodiments. Register value 1002 may be observed as "Changed, Same, Changed, Same, Changed," which corresponds to a string "1, 0, 1, 0, 1" in an observed sequence. The string "1, 0, 1, 0, 1" in a hold sequence can be used as a phase marker. This string corresponds to observed hold value 1004 which is a string "2, 2." Generally, a nominal frequency for a sensor update may be 2 kHz, and this would correspond to a nominal period of 500 μs. However, when the sensor update frequency as estimated is less than 2 kHz (i.e., updates are occurring at a slower pace), the corresponding sensor update period 1010 is greater than the nominal period, 500 μs.

In instances where a phase marker "2, 2" is observed in a hold sequence at a given time T1006, this corresponds to a marker "0, 1, 0, 1" in an observed sequence. A microcontroller observes the sensor data at a sampling frequency of 3 kHz, which corresponds to 333.3 µs. Since the last register update is observed at the given time T1006, a sampling period prior to that must have occurred at or about time T−333.3 µs, 1008. However, the sensor is known to be updating at a sensor update period 1010 that is greater than the nominal period, 500 µs. Also, from the string "2, 2" it is known that a register update occurred two sample periods prior to the most recent recorded register update at the given time T1006. Accordingly, it may be inferred that the register update prior to the most recent update occurred at or about T—333−500 µs, or T—833.3 ||s, 1012. Generally, a phase marker "2,2" in the hold sequence is indicative of a sensor update phase of t—833.3 µs+Period, where Period corresponds to the sensor update period 1010, which may, in turn, be determined from the estimated sensor update frequency.

Figure 11:
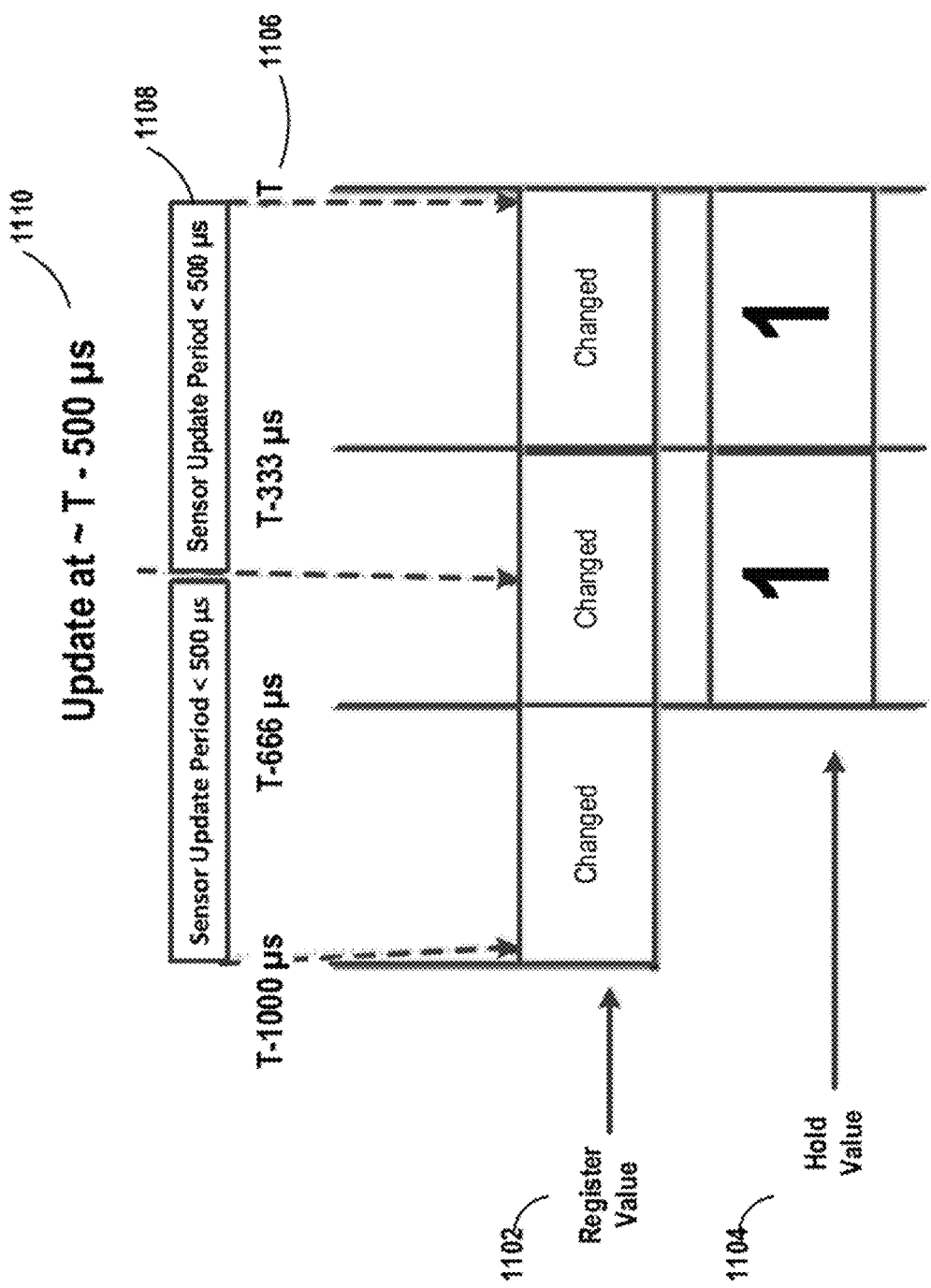
FIG. 11 illustrates another example estimation of a sensor update phase, according to example embodiments.

FIG. 11 illustrates another example estimation of a sensor update phase, according to example embodiments. Register value 1102 may be observed as "Changed, Changed, Changed," which corresponds to a string "1, 1, 1" in an observed sequence. This string corresponds to observed hold value 1104 which is a string "1, 1." The string "1, 1" in a hold sequence can be used as another phase marker. Generally, a nominal frequency for a sensor update may be 2 kHz, and this would correspond to a nominal period of 500 µs. However, when the sensor update frequency as estimated is greater than 2 kHz (i.e., updates are occurring at a faster pace), the corresponding sensor update period 1108 is less than the nominal period, 500 µs.

In instances where a phase marker "1, 1" is observed in a hold sequence at a given time T 1106, this corresponds to a marker "1, 1" in an observed sequence. A microcontroller observes the sensor data at a sampling frequency of 3 kHz, which corresponds to 333.3 µs. Since the last register update is observed at the given time T 1106, and the phase marker "1, 1" indicates that a known resister update is observed to have occurred in the previous sampling period, it may be inferred that the register update prior to the most recent update occurred at or about T—sensor update period 1108, or at or about T—nominal period, which is T—500 µs. Generally, a phase marker "1, 1" in the hold sequence is indicative of a sensor update phase of T−500 µs+Period, where Period corresponds to the sensor update period, which may, in turn, be determined from the estimated sensor update frequency.

In some instances, a sensor update frequency greater than 2 kHz may also cause an observed sequence to include skipped resister updates (based on the over counting scenario described previously). Generally, from an observed skipped register update at a given time, T, it can be inferred that an extra register update would have been observed (but was not observed due to a phantom register update) at either lime T or at T−666.6 µs. Additional information from the observed sequence can be determined to identify the actual phase marker from among the two choices, for a skipped register update, and an extra register update.

In some embodiments, an error in the sensor update phase as estimated can be reduced based on a weighted average of hold values over time. For example, as previously described, phase markers may indicate that a sensor update occurred at T−833.3 µs, corresponding to a sensor frequency faster than 2 kHz, or at T−500 µs, corresponding to a sensor frequency slower than 2 kHz. These estimates depend on the sensor update period, which is determined from the estimated sensor update frequency.

Accordingly, an error in estimating the sensor update frequency may result in an error in estimating the sensor update phase. For example, the estimated sensor update frequency may he 495 µs. Accordingly, a phase marker at a given time T may indicate that the sensor update may have occurred between T−495 µs and T−505 µs. An error estimate may be determined as:

Phase Error<|Sensor Update Period−Nominal Period|

=|Sensor Update Period−500 µs| where |x| denotes an absolute value of a quantity x. Generally, in a hold sequence, phase markers are uniformly distributed around a given time at which the estimation is performed. Accordingly, phase error can be reduced by taking a weighted average of multiple phase markers, or by deducing actual phase from errors of multiple phase markers.

V. Example Sensor Timestamp Estimating Operations

As described herein, the MCU receives sensor data at a sampling frequency which is different from the nominal frequency at which the sensor is configured to operate. Typically, the sensor update frequency as estimated is close to the nominal frequency. However, the MCU is not aware of an actual timestamp associated with an observation of sensor data. Such accuracy can be of high significance in various applications. For example, autonomous and/or semi-autonomous driving control systems often depend on sensor data, and initiate operational activity based on the sensor data. For example, a camera mounted on vehicle 100 or 200 may provide timestamped data to control system 106. Such data (e.g., traffic light turning red) may be time-sensitive, and vehicle 100 or vehicle 200 may have to initiate braking action to bring vehicle 100 or 200 to a halt. Braking action involves decelerating vehicle 100 or 200, and therefore, vehicle 100 or 200 relies on an accurate determination of when sensor data is received from the accelerometer. Accordingly, as described herein, in some embodiments, a timestamp corresponding to an update of the register can be determined based on the sensor update frequency as estimated and the sensor update phase as estimated.

Figure 12:
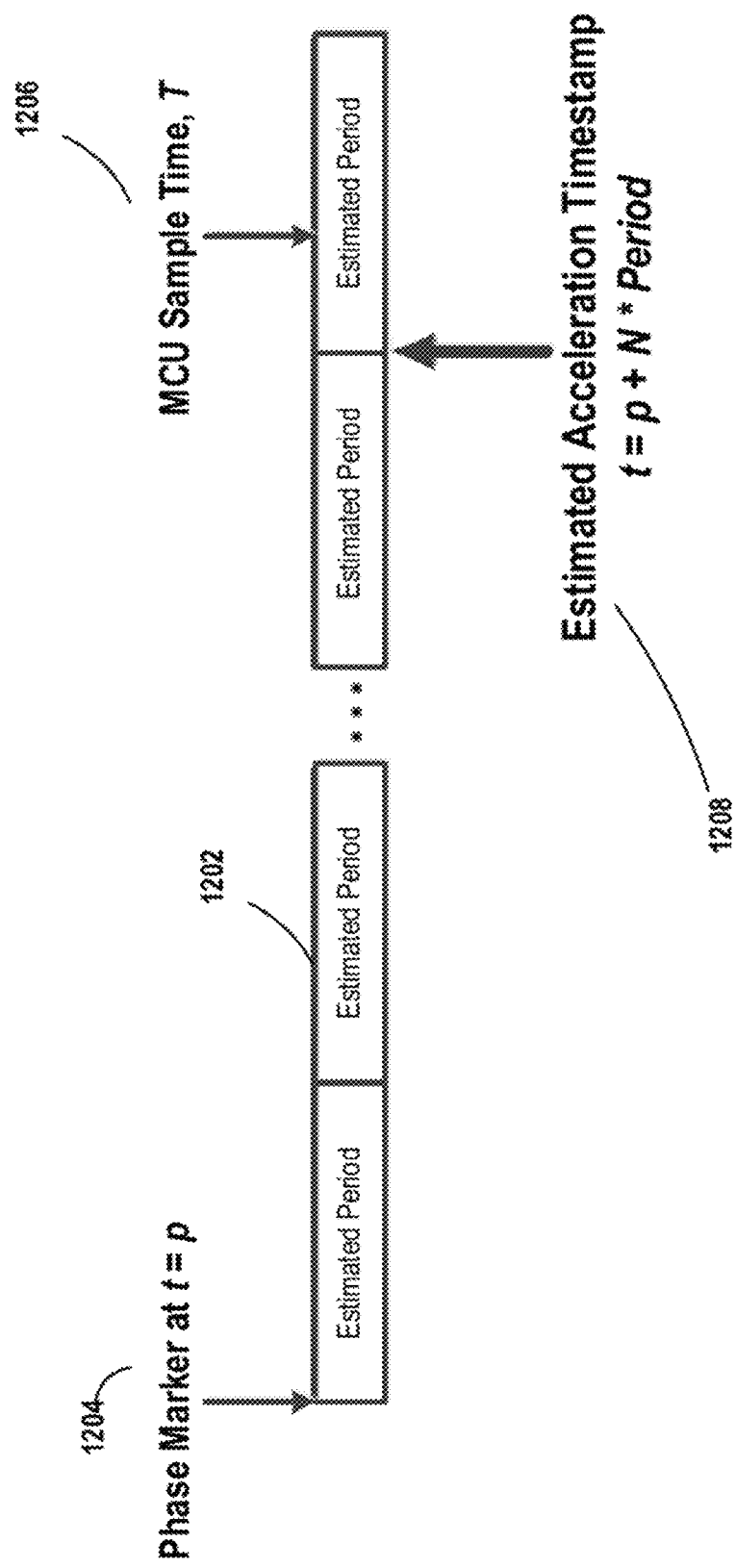
FIG. 12 illustrates an example determination of timestamp data, according to example embodiments.

FIG. 12 illustrates an example determination of timestamp data, according to example embodiments. MCU may sample sensor data at a sample time, T 1206. Accordingly, it may be determined that a most recent phase marker 1204 was observed at time, t=p. For example, MCU can maintain a record of when phase markers are observed in a hold sequence, as measured by a clock in the MCU. Although the sensor may have an internal clock, generally, the clock in the MCU clock and the clock in the sensor are not able to communicate with one another.

Based on an estimated sensor period, Period 1202 (as can be estimated based on the techniques described herein), an integer value N can be determined so that:

$$p+N*Period \leq T<p+(N+1)*Period \quad \text{(Eqn. 9)}$$

In other words, N counts the smallest number of Periods that have passed between the MCU Sample Time, T 1206 and the last observed phase marker 1204 at time, t=p. Accordingly, the timestamp 1208 for a register update corresponding to MCU Sample Time, T 1206 is given by:

$$\text{Estimated Timestamp}=p+N*Period \quad \text{(Eqn. 10)}$$

In some implementations, more than one sensor may be sampled simultaneously. Accordingly, estimation of sensor update frequency, sensor phase update, and detection of phase markers may be performed for multiple sensors, and a common sensor update frequency and sensor phase update may be determined.

VI. Example Methods

Figure 13:
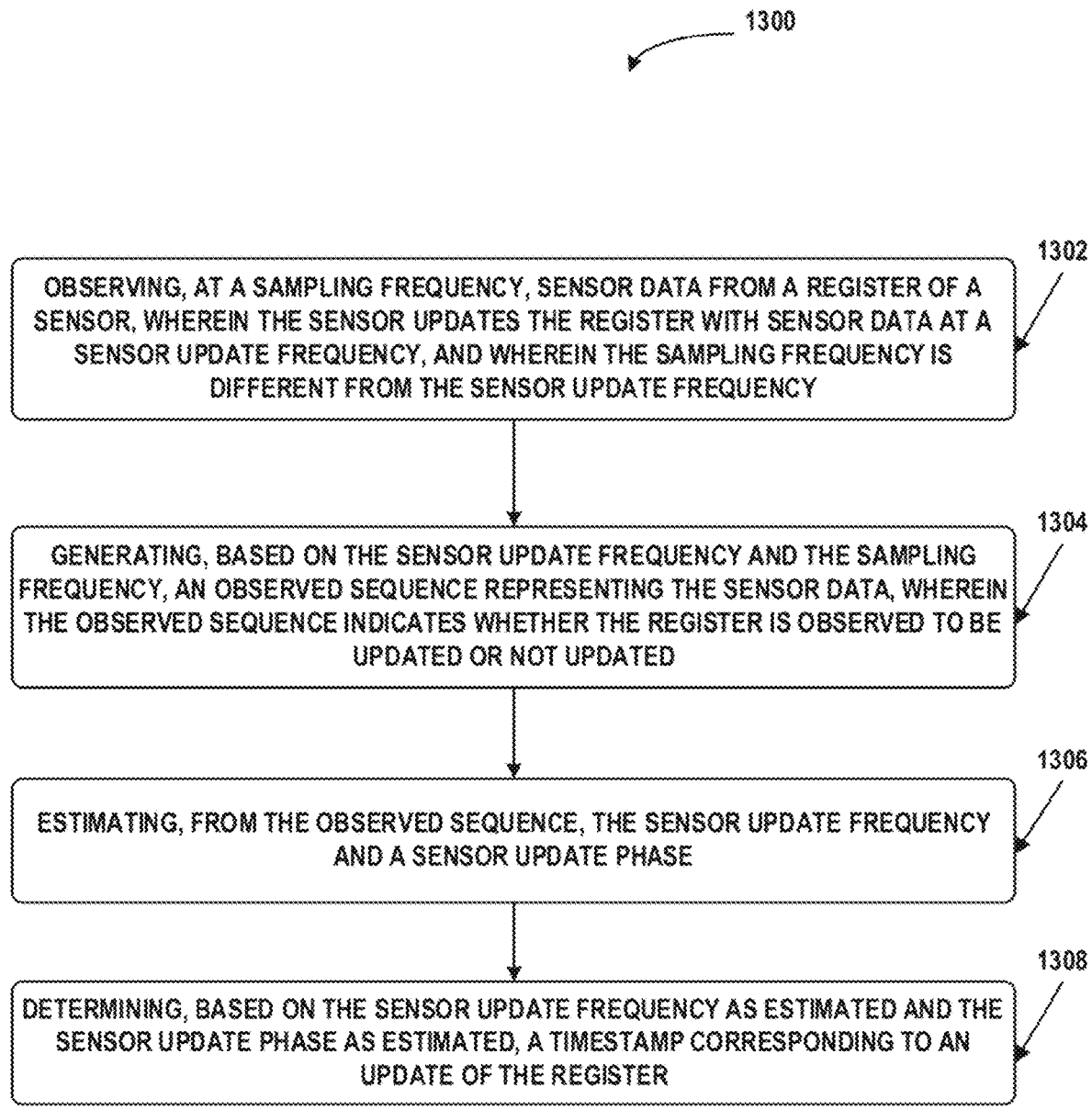
FIG. 13 is a flow chart of a method, in accordance with example embodiments.

FIG. 13 is a flowchart of a method 1300, according to example embodiments. Method 1300 presents an embodiment of a method that could be used with any of vehicle 100, vehicle 200, and/or system 302, for example. Method 1300 may include one or more operations, functions, or actions as illustrated by one or more of blocks 1302-1308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, for method 1300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 1300 and other processes and methods disclosed herein, each block in FIG. 13 may represent circuitry that is wired to perform the specific logical functions in the process.

At block 1302, method 1300 involves observing, at a sampling frequency, sensor data from a register of a sensor. The sensor updates the register with sensor data at a sensor update frequency. The sampling frequency is different from the sensor update frequency. In some embodiments, the sensor may be an accelerometer mounted on a vehicle, such as vehicle 100 or vehicle 200.

At block 1304, method 1300 involves generating, based on the sensor update frequency and the sampling frequency, an observed sequence representing the sensor data. The observed sequence indicates whether the register is observed to be updated or not updated.

At block 1306, method 1300 involves estimating, from the observed sequence, the sensor update frequency and a sensor update phase. The estimation of the sensor update frequency at block 1306 may be in line with the discussion of FIGS. 4-9. The estimation of the sensor update phase at block 1306 may be in line with the discussion of FIGS. 10-11.

At block 1308, method 1300 involves determining, based on the sensor update frequency as estimated and the sensor update phase as estimated, a timestamp corresponding to an update of the register. The estimation of the sensor update phase at block 1308 may be in line with the discussion of FIG. 12.

VII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will the readily understood that the aspects of the present disclosure, as generally described herein, and illustrated in the figures, can be arranged, substituted, combined, separated, and designed in a wide variety of different configurations.

What is claimed is:

1. A system comprising:
   a sensor comprising a register, wherein the sensor updates the register with sensor data at a sensor update frequency; and
   control circuitry configured to perform operations comprising:
   observing, at a sampling frequency, sensor data from the register, wherein the sampling frequency is different from the sensor update frequency;
   generating, based on the sensor update frequency and the sampling frequency, an observed sequence representing the sensor data, wherein the observed sequence indicates whether the register is observed to be updated or not updated;
   estimating, from the observed sequence, the sensor update frequency and a sensor update phase; and
   determining, based on the sensor update frequency as estimated and the sensor update phase as estimated, a timestamp corresponding to an update of the register.

2. The system of claim 1, wherein (1) the sensor is configured to update the register at a nominal frequency, and (2) the sensor data captures every update of the register, and wherein the operations further comprise:
   generating, based on the nominal frequency and the sampling frequency, a baseline sequence representing the sensor data;
   comparing the observed sequence and the baseline sequence;
   identifying, based on the comparing, one of a skipped register update or an extra register update; and
   estimating the sensor update frequency by calculating an average time between one of successive skipped register updates or successive extra register updates.

3. The system of claim 1, wherein (1) the sensor is configured to update the register at a nominal frequency, (2) the sensor data does not capture at least one update of the register, and (3) the sensor update frequency is less than the nominal frequency, and wherein the operations further comprise:
   transforming the observed sequence to a hold sequence, wherein the hold sequence comprises hold values, and wherein a hold value represents a number of times the register is observed to indicate that a sensor value remains unchanged during consecutive sampling periods; and estimating the sensor update frequency based on a ratio of observed hold values in the hold sequence over a time interval.

4. The system of claim 1, wherein (1) the sensor is configured to update the register at a nominal frequency, (2) the sensor data does not capture at least one update of the register, and (3) the sensor update frequency is greater than the nominal frequency, and wherein the operations further comprise:

transforming the observed sequence to a bold sequence, wherein the hold sequence comprises hold values, and wherein a hold value represents a number of times the register is observed to indicate that a sensor value remains unchanged during consecutive sampling periods; and estimating the sensor update frequency comprises determining a normalized histogram comprising respective frequencies of the hold values.

5. The system of claim 4, wherein the operations further comprise:

reducing an error in the estimating of the sensor update frequency by applying greater weights to more recent observed sensor data than to earlier observed sensor data.

6. The system of claim 1, wherein the sensor update frequency as estimated is less than a nominal frequency at which the sensor is configured to operate, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods;

identifying, at a given time, a phase marker comprising two consecutive terms in the hold sequence corresponding to hold value 2;

in response to the identifying of the phase marker, determining a nominal period based on (1) the nominal frequency and (2) a sampling period based on the sampling frequency; and estimating the sensor update phase based on the given time, the nominal period, and the sampling period.

7. The system of claim 1, wherein the sensor update frequency as estimated as greater than a nominal frequency at which the sensor is configured to operate, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods;

identifying, at a given time, a phase marker comprising two consecutive terms in the hold sequence corresponding to hold value 1;

in response to the identifying of the phase marker, determining a nominal period based on the nominal frequency; and estimating the sensor update phase based on the given time and the nominal period.

8. The system of claim 1, wherein the operations further comprise:

reducing an error in the sensor update phase as estimated based on a weighted average of hold values over time.

9. The system of claim 1, wherein the operations further comprise:

adjusting the sensor update frequency as estimated to compensate for a change in a thermal property of the sensor.

10. The system of claim 1, wherein the sensor is an accelerometer mounted on a vehicle.

11. The system of claim 1, wherein the sensor is configured to update the register at a nominal frequency of 2 kiloHertz (kHz) and the sampling frequency is at 3 kHz.

12. A vehicle comprising:

a sensor comprising a register, wherein the sensor updates the register with sensor data at a sensor update frequency;

one or more processors; and data storage storing instructions that, when executed by the one or more processors, cause the vehicle to perform operations comprising:

observing, at a sampling frequency, sensor data from the register, wherein the sampling frequency is different from the sensor update frequency;

generating, based on the sensor update frequency and the sampling frequency, an observed sequence representing the sensor data, wherein the observed sequence indicates whether the register is observed to be updated or not updated;

estimating, from the observed sequence, the sensor update frequency and a sensor update phase; and determining, based on the sensor update frequency as estimated and the sensor update phase as estimated, a timestamp corresponding to an update of the register.

13. The vehicle of claim 12, wherein (1) the sensor is configured to update the register at a nominal frequency, and (2) the sensor data captures every update of the register, and wherein the operations further comprise:

generating, based on the nominal frequency and the sampling frequency, a baseline sequence representing the sensor data;

comparing the observed sequence and the baseline sequence;

identifying, based on the comparing, one of a skipped register update or an extra register update; and estimating the sensor update frequency by calculating an average time between one of successive skipped register updates or successive extra register updates.

14. The vehicle of claim 12, wherein (1) the sensor is configured to update the register at a nominal frequency, (2) the sensor data does not capture at least one update of the register, and (3) the sensor update frequency is less than the nominal frequency, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods; and estimating the sensor update frequency based on a ratio of observed hold values in the hold sequence over a time interval.

15. The vehicle of claim 12, wherein (1) the sensor is configured to update the register at a nominal frequency, (2) the sensor data does not capture at least one update of the register, and (3) the sensor update frequency is greater than the nominal frequency, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods; and estimating the sensor update frequency comprises determining a normalized histogram comprising respective frequencies of the hold values.

16. The vehicle of claim 12, wherein the sensor update frequency as estimated is less than a nominal frequency at which the sensor is configured to operate, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods;

identifying, at a given time, a phase marker comprising two consecutive terms in the hold sequence corresponding to hold value 2;

in response to the identifying of the phase marker, determining a nominal period based on (1) the nominal frequency and (2) a sampling period based on the sampling frequency; and estimating the sensor update phase based on the given time, the nominal period, and the sampling period.

17. The vehicle of claim 12, wherein the sensor update frequency as estimated is greater than a nominal frequency at which the sensor is configured to operate, and wherein the operations further comprise:

transforming the observed sequence to a hold sequence, wherein the hold sequence comprises hold values, and wherein a hold value represents a number of times the register is observed to indicate that a sensor value remains unchanged during consecutive sampling periods;

identifying, at a given time, a phase marker comprising two consecutive terms in the hold sequence corresponding to hold value 1;

in response to the identifying of the phase marker, determining a nominal period based on the nominal frequency; and estimating the sensor update phase based on the given time and the nominal period.

18. The vehicle of claim 12, wherein the sensor is an accelerometer mounted on the vehicle.

19. The vehicle of claim 12, wherein the sensor is configured to update the register at a nominal frequency of 2 kiloHertz (kHz) and the sampling frequency is at 3 kHz.

20. A method comprising:

observing, at a sampling frequency, sensor data from a register of a sensor, wherein the sensor updates the register with sensor data at a sensor update frequency, and wherein the sampling frequency is different from the sensor update frequency;

generating, based on the sensor update frequency and the sampling frequency, an observed sequence representing the sensor data, wherein the observed sequence indicates whether the register is observed to be updated or not updated;

estimating, from the observed sequence, the sensor update frequency and a sensor update phase; and determining, based on the sensor update frequency as estimated and the sensor update phase as estimated, a timestamp corresponding to an update of the register.

* * * * *